US007286061B2

(12) United States Patent
Atkinson

(10) Patent No.: US 7,286,061 B2
(45) Date of Patent: Oct. 23, 2007

(54) METHOD AND APPARATUS FOR ACTIVATING OPTICAL MEDIA

(75) Inventor: Paul Atkinson, Poway, CA (US)

(73) Assignee: Kestrel Wireless, Inc., San Diego, CA (US)

( * ) Notice: Subject to any disclaimer, the term of this patent is extended or adjusted under 35 U.S.C. 154(b) by 270 days.

(21) Appl. No.: 10/874,642

(22) Filed: Jun. 23, 2004

(65) Prior Publication Data

US 2004/0257195 A1 Dec. 23, 2004

Related U.S. Application Data

(63) Continuation-in-part of application No. 10/632,047, filed on Jul. 31, 2003, now Pat. No. 7,227,445.

(60) Provisional application No. 60/480,686, filed on Jun. 23, 2003.

(51) Int. Cl.
*G05B 19/00* (2006.01)

(52) U.S. Cl. ................ 340/825.25; 340/5.2; 340/5.22; 340/5.26; 340/5.6; 340/5.1; 369/273; 369/272.1; 720/718; 720/719

(58) Field of Classification Search ........... 340/825.25, 340/5.51, 5.5, 5.2, 5.1; 726/27, 28, 30, 33, 726/36; 369/273, 272.1; 713/189; 720/718
See application file for complete search history.

(56) References Cited

U.S. PATENT DOCUMENTS

| | | | |
|---|---|---|---|
| 3,883,736 | A | 5/1975 | Liddell |
| 5,485,520 | A | 1/1996 | Chaum et al. |
| 5,608,778 | A | 3/1997 | Partridge |

(Continued)

FOREIGN PATENT DOCUMENTS

| | | |
|---|---|---|
| GB | 2354834 | 4/2001 |

(Continued)

OTHER PUBLICATIONS

Anon., A Shovel Maker Searching Out Gold Diggers in the US: Brokat Aims to Raise its Profile-Following Interest in Germany over its Electronic Signature Technology, say Bertrand Benoit, Financial Times London Edition (Abstract Only), Mar. 23, 2000, p. 3

(Continued)

*Primary Examiner*—Brian Zimmerman
*Assistant Examiner*—Vernal Brown

(57) ABSTRACT

A method and apparatus for activating an optical media device with a conditional access mechanism is presented. The optical media device is configured with a conditional access system such as an optical shutter assembly and the apparatus is configured to receive such an optical media device and establish communication with the optical media device. The apparatus may include one or more electrodes that are positioned such that they come into physical or near physical contact with a corresponding electrode on the optical media device and thereby establish electrical communication. The apparatus may also be configured to send and receive acoustical signals to establish an acoustical communication path with the optical media device. A data communication path may also be established between the optical media device and the apparatus. Upon establishing communication with the optical media device, the apparatus may send an activation signal to the optical media device to activate the conditional access system. The activation signal may originate from a remote activation center that itself is configured to authenticate access requests. The apparatus may communication with the activation center via a data communication network or a public switched telephone network.

33 Claims, 4 Drawing Sheets

U.S. PATENT DOCUMENTS 5,644,444 A * 7/1997 Braithwaite et al. .......... 360/60
5,712,638 A 1/1998 Issa
5,739,754 A 4/1998 Schrott et al.
5,815,484 A 9/1998 Smith
5,862,117 A * 1/1999 Fuentes et al. ............. 369/100
5,874,902 A 2/1999 Heinrich
5,905,798 A 5/1999 Nerlikar et al.
5,909,492 A 6/1999 Payne et al.
6,011,772 A 1/2000 Rollhaus et al.
6,046,676 A 4/2000 Ward et al.
6,067,028 A 5/2000 Takamatsu
6,104,281 A 8/2000 Heinrich et al.
6,198,875 B1 3/2001 Edenson et al.
6,226,619 B1 5/2001 Halperin et al.
6,249,227 B1 6/2001 Brady et al.
6,259,506 B1 7/2001 Lawandy
6,298,336 B1 10/2001 Davis et al.
6,300,873 B1 10/2001 Kucharczyk et al.
6,338,933 B1 1/2002 Lawandy et al.
6,343,063 B1 1/2002 Rollhaus et al.
6,381,584 B1 4/2002 Ogram
6,384,710 B1 5/2002 Lemense et al.
6,389,055 B1 5/2002 August
6,434,109 B2 8/2002 Rollhaus et al.
6,441,380 B1 8/2002 Lawandy
6,489,892 B2 12/2002 Lawandy et al.
6,496,406 B1 12/2002 Kitagawa
6,511,728 B1 1/2003 Bakos et al.
6,537,635 B1 3/2003 Bakos et al.
6,542,735 B1 4/2003 Carley
6,806,842 B2 10/2004 King et al.
6,902,111 B2 6/2005 Han et al.
6,917,579 B2 7/2005 Thompson et al.
6,986,151 B2 * 1/2006 Lenssen et al. ............. 720/718
7,042,615 B2 5/2006 Richardson
7,065,645 B2 6/2006 Teicher
7,080,444 B1 7/2006 Craig et al.
7,086,073 B2 8/2006 Benedikt et al.
7,127,066 B2 10/2006 Solomon et al.
7,183,924 B1 2/2007 Ku
2001/0020254 A1 * 9/2001 Blumenau et al. .......... 709/229
2002/0010864 A1 1/2002 Safa
2002/0039329 A1 * 4/2002 Yonezawa ................ 369/30.15
2002/0051536 A1 5/2002 Shirakawa et al.
2002/0101995 A1 8/2002 Hashimoto et al.
2002/0143634 A1 10/2002 Kumar et al.
2002/0147913 A1 10/2002 Lun Yip
2002/0152123 A1 10/2002 Giordano et al.
2002/0175818 A1 * 11/2002 King et al. .............. 340/572.8
2003/0005136 A1 1/2003 Eun
2003/0028787 A1 2/2003 Fayad et al.
2004/0052202 A1 3/2004 Brollier
2004/0054594 A1 * 3/2004 Forster et al. ................ 705/18
2004/0121268 A1 6/2004 Conroy et al.
2004/0200061 A1 10/2004 Coleman et al. .............. 29/825
2004/0228262 A1 11/2004 Bigly
2004/0260778 A1 12/2004 Banister et al.
2005/0083829 A1 4/2005 Selinfreund et al.
2005/0240498 A1 10/2005 Thaler

FOREIGN PATENT DOCUMENTS

WO WO 2004/097731 A2 11/2004

OTHER PUBLICATIONS

Anon., Nokia Trials Cashless Payment Technology for Mobile Phones, Precision Marketing, Jan. 29, 2001, vol. 13, No. 18, p. 8.

Harris, R., Security Measures Turn off Audiophiles from New Gadgets to Thwart Digital Piracy, Companies Have Created CD Players and Discs That Block Copying, Philidelphia Inquirer, Nov. 7, 2002, City-D-East Edition, business Section, p. C11, see paragraph beginning "DVD-Audio discs use."

Hoffman, K.E., New Options in Wireless Payments, Internet World, Apr. 1, 2001, vol. 7, No. 7, p. 37.

Schoolcraft, L.R., Powertel Tests Smart Cards at FSU, Business Journal—Jacksonville, Jan. 30, 1998, vol. 13, No. 17, p. 3.

Dezoysa, S., The Cost of M-Commerce, Telecommunications, Jul. 2001, vol. 35, No. 7, p. 10.

* cited by examiner

METHOD AND APPARATUS FOR ACTIVATING OPTICAL MEDIA

RELATED APPLICATION

The present application is a continuation-in-part of U.S. patent application Ser. No. 10/632,047 filed on Jul. 31, 2003 now U.S. Pat. No. 7,227,445 and claims priority to U.S. provisional patent application Ser. No. 60/480,686 filed on Jun. 23, 2003, each of which is incorporated herein by reference in its entirety.

BACKGROUND

1. Field of the Invention

The present invention generally relates to optical media systems and more specifically relates to activating optical media devices that have a conditional access capability such as an optical shutter system.

2. Related Art

It is often desirable for commercial, security and privacy reasons for certain conditions to be met before content stored in media such as optical discs can be accessed. An example is a security scheme that requires the user to enter a password before they can access the content stored on a compact disc ("CD"). Another example is a rental scheme that conditions access to a movie stored on a digital versatile disc ("DVD") upon receipt of payment by the rental company at a remote location.

With conventional media, conditional access schemes are effectuated external to the media by a host device such as a personal computer ("PC"). The password in a security scheme for CDs for example is typically entered into a software application hosted on a PC, and it is the application which affects the ability to access the content either through control of the optical drive in the PC, or in the method used to decode the content. In neither case does the CD itself participate in effectuating the conditional access; it is always readable.

Conventional systems that rely on external devices for effectuating conditional access are comparatively easy to breach. Moreover, they add complexity, cost and undesirable burdens on the user because they require that the device used to consume the content has the capability to effectuate the conditional access scheme. That means that conditional access depends on devices like personal computers and can not be effectuated by conventional CD or DVD players.

New types of media are emerging that incorporate the ability to effectuate conditional access to the content stored within them. An example is an optical disc incorporating an electro-optic film that changes in response to an external signal in ways that affect the interrogating laser's ability to access the content stored within (e.g. it switches from clear to opaque).

Therefore, the introduction of new media with conditional access capabilities has created a need in the industry for an inexpensive and simple to operate apparatus to effectuate the conditional access features of these new forms of media. Furthermore, it is desirable that such an apparatus be separate from the device used to consume the media content. It is also highly desirable that such an apparatus be able to effectuate conditional access schemes involving remote and/or third parties.

SUMMARY

The present invention provides an apparatus and method for activating optical media device that are configured with a conditional access system such as an optical shutter assembly. The apparatus is configured to receive an optical media device such as a CD, DVD, holographic memory, or optical cube and includes one or more electrodes that are located such that they come into physical or near physical contact with a corresponding electrode on the optical media device. The corresponding electrodes are in electrical communication such that the apparatus can send data communications to the optical media device that effects a change in the conditional access system or causes the optical media device to modify its optical, physical, or visual properties. Additionally, the electrodes allow the apparatus to send power to the optical media device and receive data communications from the optical media device.

The method for activating the optical media device includes establishing communication with an activation center and sending a request for activation to the activation center. Upon validation of the activation request, perhaps after a series of challenges (e.g., user name and password) or after a payment transaction, the activation center sends an authorization to the apparatus. Accordingly, upon receipt of the authorization, the apparatus sends the authorization to the optical media device via the electrical communication pathway established by the corresponding electrodes. Alternatively, the apparatus may first query the optical media device for an identification or serial number or the apparatus may read the identification or serial number from the optical media device. Then the identification can be sent to the activation center so that the appropriate authorization for the specific optical media device may be sent back to the apparatus.

Additional advantages of the invention including alternative communication paths and methods of activating an optical media device will become apparent to those having skill in the art after reviewing the following figures and detailed description of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
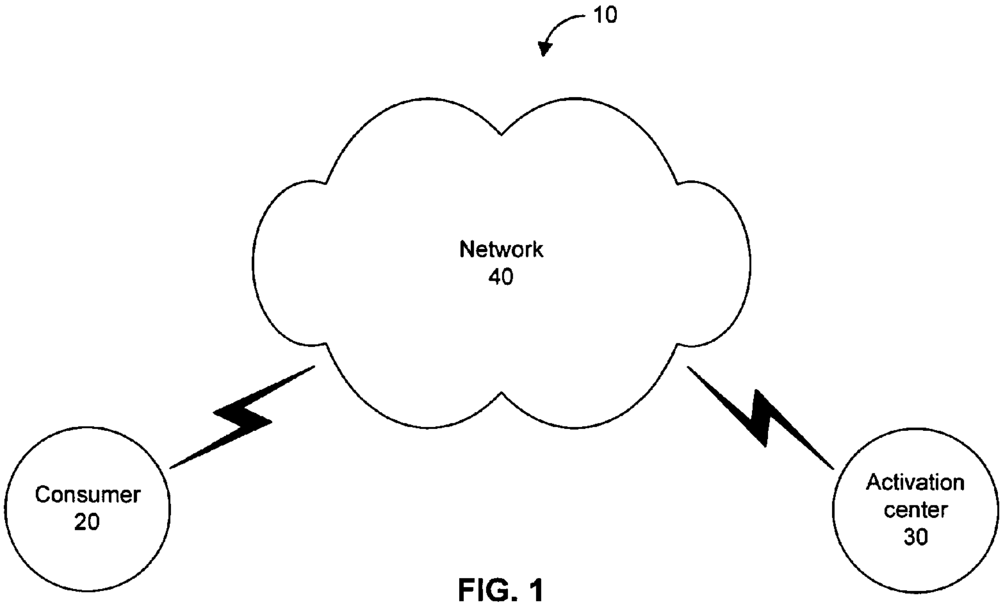
FIG. 1 is a high level network diagram illustrating an example system for remotely activating an optical media device according to an embodiment of the present invention.

Certain embodiments as disclosed herein provide for an apparatus and method for providing conditional access to an optical media device that has a conditional access mechanism such as an optical shutter layer. For example, one method as disclosed herein allows for an apparatus to be communicatively coupled with an activation center via a data or telecommunications network. The apparatus is configured to make electrical or wireless contact with the optical media device and exchange data communications with the optical media device and supply power to the optical media device. The optical media device, upon receiving and validating an appropriate authorization code, receives power from the apparatus and directs the power to its optical shutter layer to activate the optical shutter.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Introduction

The content contained in optical media devices such as a CD, DVD and laser discs may be accessed via players that shine light (e.g., a laser) on reflective materials contained within the media and then 'read' the reflection. Traditionally these media are always readable, meaning that light can always be reflected off of the reflective material within the media to read the content of the media.

New types of optical media devices are being developed that have optical properties that can be altered in ways that affect their readability by conventional reading devices such as CD players, DVD players, game consoles, and other devices capable of reading from or writing to optical media devices ("players") in response to internal or external stimuli. For example, in the spring of 2003 an optical media device was announced that employed a coating that when exposed to air the coating oxidized and after a period of time such as 48 hours the coating darkened sufficiently that the disc could no longer be read by a conventional player.

Other types of optical media devices are also being developed that incorporate an optical shutter that can be repeatedly activated (i.e., toggled open and closed). The optical shutter comprises thin layers of materials embedded in and/or on the media and these layers of materials have optical properties that change in response to internal or external stimuli, for example electrical signals, light, acoustic energy, radio frequency signals, and radiation, just to name a few. An example of such an optical media device is described in U.S. patent application Ser. No. 10/632,047 which is incorporated herein by reference in its entirety.

An optical shutter may be configured to change state only once (e.g. open or close) or change state any number of times (e.g., open, close; open, close, etc.). The optical shutter may also be configurable with an auto decay feature whereby the shutter is opened and then closes at some predetermined future time. For example, the shutter may stay open for 2 hours or 2 days and then automatically close to provide a discrete window of readability for the optical media device.

Additionally, these optical media devices may also change their visual property in order to identify, for example, whether the optical shutter is currently open or closed. For example, a timer or countdown or draining meter may be displayed on the surface of the media in order to provide a visual signal of the remaining time that the optical shutter will be open. Also, the optical media device may display its serial number or the power level of its battery in an integral electro-chromic readout or in some other fashion. Thus, the optical media device may modify not only its readability in response to internal or external stimuli, but it may also modify is visual appearance as well.

Optical media devices with optical shutters can be used in a variety of commercial applications including on-demand and pay-per-use, and controlled distribution of pre-lease content, or free trial promotions. Accordingly, an apparatus and method is needed to activate the optical shutter on the optical media device at the consumer's location or point-of-presence ("POP") in a controlled manner that facilitates different business objectives (e.g., collection of rental fees coordinated with theatrical release). Activation of the optical media device is needed for the content on the media to be available to the consumer.

FIG. 1 is a high level network diagram illustrating an example system 10 for remotely activating an optical media device according to an embodiment of the present invention. In the illustrated embodiment, the system 10 comprises a consumer 20 that is communicatively coupled with an activation center 30 via a network 40. The subject optical media device (not shown) is located at the POP of the consumer 20.

The consumer 20 preferably has the subject optical media device and an apparatus configured to activate the device. The consumer 20 initiates the process of activating the conditional access mechanism, for example by merely inserting the optical media device into the apparatus or by pressing a button or providing some other input or instruction after the optical media device has been inserted into the apparatus. In one embodiment, the optical media device is not inserted into or physically connected to the apparatus, although the optical media device is communicatively coupled with the apparatus.

The consumer 20 can gain access to the network 40 in a variety of ways. For example, the consumer 20 may have a personal computer that is connected to a local area data network via a conventional telephonic modem or a cable modem. The local area data network can preferably be part of the global community of networks colloquially referred to as the Internet. The consumer 20 may also gain access to network 40 via a wireless communication device and a local wireless communication network. The consumer 20 may also gain access to the network 40 through the apparatus for activating the optical media device. It will be readily apparent to those having skill in the art a plurality of additional ways for consumer 20 to gain access to network 40.

Activation center 30 may be located in any geographical region and is also connected to network 40, perhaps through an intermediary local area network (not shown). The activation center 30 can be implemented as a standard personal or server computer and is preferably is communicatively coupled with one or more consumers via network 40 and is preferably configured to handle a plurality of consumer requests at the same time. Additionally, there may be multiple activation centers 30, for example a discrete activation center 30 may be employed for a particular content provider while a different content provider may employ its own discrete activation center 30. The activation center 30 may also be in the same location as the consumer 20, in which case the network 40 may be a local area network, a personal area network, a peer-to-peer network, or a direct wired or wireless link (such as a Bluetooth or radio frequency link).

Network 40 can be any of a variety of networks or group of interconnected networks. Network 40 can be a telecommunications network capable of establishing circuit communications between network devices. Network 40 may also be a data communications network capable of non-dedicated packet based data communications, for example implementing the TCP/IP protocol. Network 40 may also be any combination of networks including local area networks, wide area networks, wireless networks, wired networks, circuit switched networks, and packet switched networks.

Figure 2:
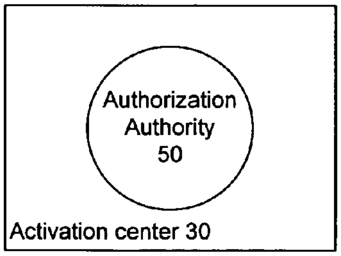
FIG. 2 is a block diagram illustrating an example activation center according to an embodiment of the present invention.

FIG. 2 is a block diagram illustrating an example activation center 30 according to an embodiment of the present invention. In the illustrated embodiment, the activation center 30 has an authorization authority 50. The authorization authority 50 may be implemented in software and is configured to receive communications from a consumer requesting access to an optical media device. The authorization authority 50 can then validate the request or just respond to the request with an authorization code that will activate the optical shutter on the optical media device, for example causing it to open. The authorization authority 50 preferably has access to a local or remote database (not shown) of optical media device identifiers and corresponding authorization codes. The authorization authority 50 may also have access to a database with username and password combinations in order to validate consumers or individual apparatus that are requesting an authorization code to access an optical media device.

Note that the activation authority may be remote (e.g. accessed via the Internet or phone network) or embodied in a portable device with the ability to authorize the activation via stored value and instructions. In such an embodiment where the activation authority resides in a portable device (e.g., smart card or personal digital assistant ("PDA")), the activation authority preferably has a pre-paid authorization. Additionally, in such an embodiment, the activation center may still be a remote entity that manufactures and sells the pre-paid cards or distributes electronically access codes to PDAs or smart phones or other portable electronic devices and storage devices.

Figure 3:
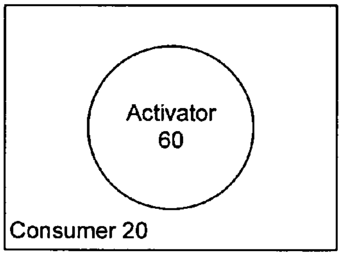
FIG. 3 is a block diagram illustrating an example consumer location according to an embodiment of the present invention.

FIG. 3 is a block diagram illustrating an example consumer 20 location according to an embodiment of the present invention. In the illustrated embodiment, the activator 60 is co-located with the consumer's 20 POP. Preferably, the activator 60 is communicatively coupled with the network 40, as previously described with respect to FIG. 1. Implementation of the activator 60 may be integrated with a personal or server computer or integrated with an optical media device player such as a CD player, DVD player, game console, or other device capable of reading from or writing to an optical media device. Preferably, however, the activator 60 is a stand alone apparatus capable of receiving an optical media device and establishing communication with both the optical media device and the activation center 60 via the network 40.

Figure 4:
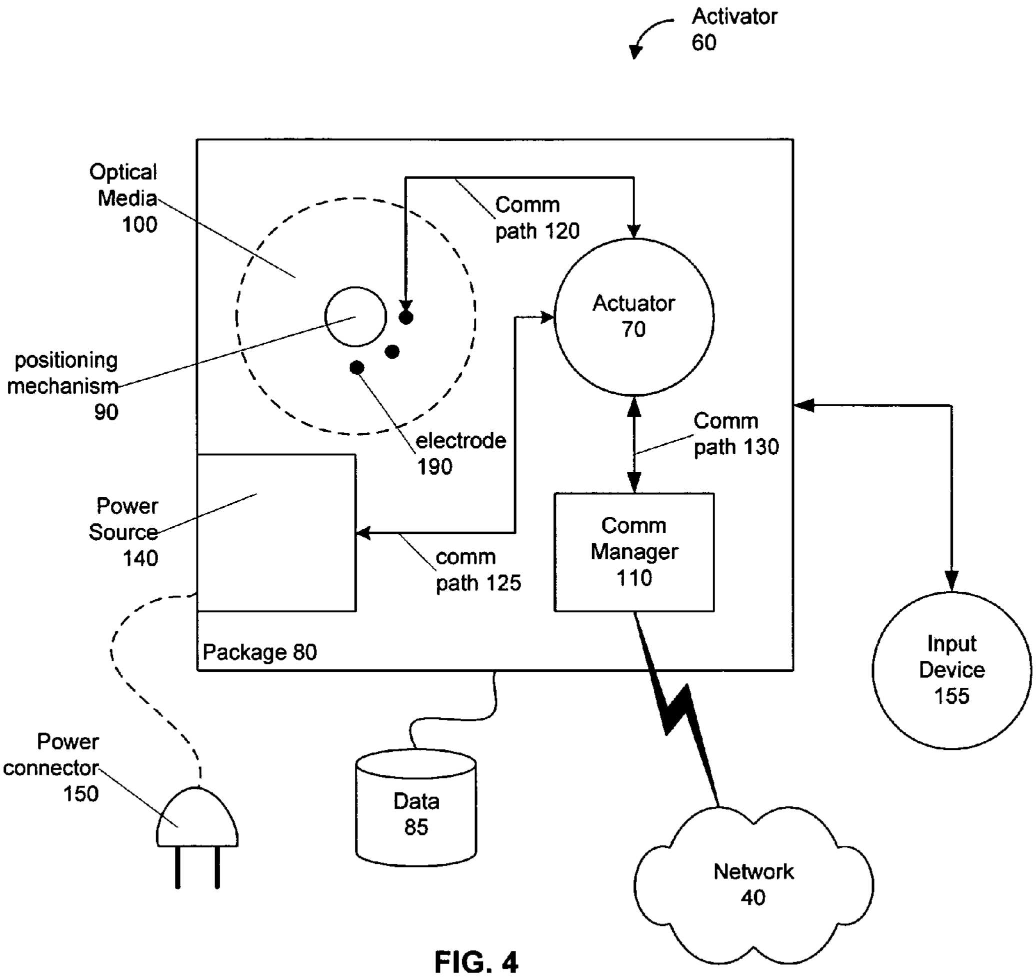
FIG. 4 is a block diagram illustrating an example activator apparatus according to an embodiment of the present invention.

FIG. 4 is a block diagram illustrating an example activator 60 apparatus according to an embodiment of the present invention. In the illustrated embodiment, the activator 60 comprises a package 80 that provides the physical housing for many of the components of the activator 60, including the actuator 70 and the positioning mechanism 90. A data storage area 85 is shown external to the package 80 but is preferably incorporated into the package 80 and available for use by the components therein, such as the actuator 70 and the communication manager 110.

The positioning mechanism 90 is used to secure an optical media device 100 (which may or may not be present in the activator 60). The actuator 70 may be implemented as a microprocessor and is communicatively coupled with: (1) one or more electrodes 190 via a communication path 120; (2) a communication manager 110 via a communication path 130; and (3) an internal or external power source 140 via a communication path 125. The power source 140 may be a replaceable internal battery or it may optionally be a converter that is connected to an external power source via power connector 150, as will be understood by those having skill in the art.

The communication manager 110 is communicatively coupled with the network 40. The communication manager 110 may comprise a microphone and speaker assembly that allows the activator 60 to connect with a remote activation center via a telecommunications network over a circuit switched connection. The communication manager 110 may alternatively communicate via a wireless local loop that connects the activator 60 to a proximal wireless device that is configured to communicate with an activation center over a telecommunication or data network. The communication manager 110 may also be implemented in a direct connect configuration wherein the communication manager 110 comprises a standard modem or a cable modem for accessing network 40. Additionally, the communication manager 110 maybe implemented as a wireless communication device that is capable of establishing a direct connection with the activation center via the network 40. The communication manager 110 may also comprise a wired connection to an external modem, a PDA, or other device capable of providing access to network 40. The communication manager 110 may also comprise a wired or wireless connection to a card reader, a smart card, an electronic wallet or other device that includes the authorization authority capability.

The activator 60 may also be configured with an optional input device 155 that may be integral to the package 80 or external and connected to the package 80 via a cable or wireless link, such as a radio frequency ("RF") or Bluetooth link. The input device 155 can preferably allow a consumer to input a serial number or other identification or pertinent information into the activator to assist in activating or otherwise manipulating the optical media device. The input device 155 may also comprise a card reader, smart card, PDA, electronic wallet or other device that includes the authorization authority capability.

Figure 5:
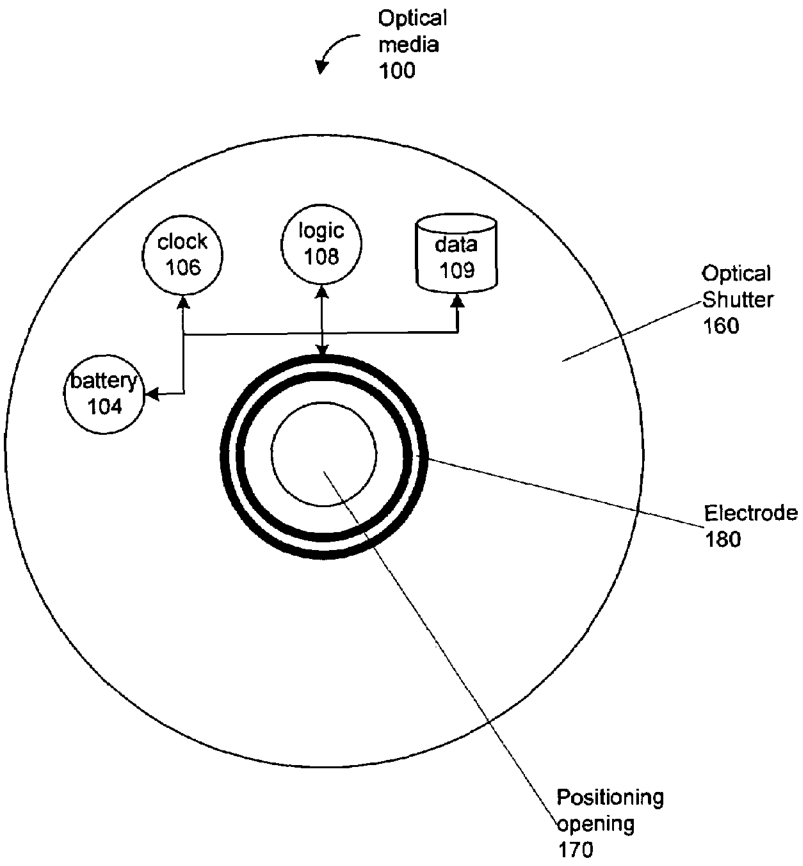
FIG. 5 is a block diagram illustrating an example optical media device with a conditional access mechanism according to an embodiment of the present invention.

FIG. 5 is a block diagram illustrating an example optical media device 100 with an optical shutter 160 according to an embodiment of the present invention. In the illustrated embodiment, the optical media device 100 comprises an optical shutter 160, one or more electrodes 180, and a positioning hole 170. The one or more electrodes 180 are illustrated as a single electrode in a complete ring around the optical media device 100. Advantageously, this configuration helps to ensure that electrical communication will be established when the optical media device 100 is inserted into or otherwise connected to the activator apparatus. Alternatively, a single or several electrodes 180 may be placed on the optical media device 100 and the activator apparatus may have an electrode configured in a ring.

Additionally, there are several components layered within the optical media device 100 including logic 108, data 109, clock 106, and battery 104. Advantageously, these components may all be directly or indirectly connected to the one or more electrodes 180. In one embodiment, the battery 104 is separately connected to the electrodes so that it may receive a charge from the power supply, as will be understood by those having skill in the art.

In one embodiment, the logic is configured to activate or deactivate the shutter mechanism or otherwise participate in the conditional access scheme for the optical media device 100. The data 109 may house a serial number or other identifier for the particular optical media device 100. Preferably, the data stored in data 109 can be updated or otherwise modified by logic 108. In one embodiment, the logic 108 is configured to provide the serial number or other information stored in data 109 in response to a request for such information, for example a request from the actuator 70.

Additionally, the clock 106 is preferably capable of tracking elapsed time or otherwise maintain an association with real time such that the logic 108 may control the conditional access mechanism such as an optical shutter and implement a discrete window of time that the optical media device 100 is readable. The battery 104 is preferably rechargeable and has a renewable charge time of 5 days or longer.

The optical shutter 160 is a material that is layered into, onto or otherwise integral to the optical media device 100 to be activated and that changes the optical properties of the media 100 (e.g., its appearance, ability to pass-through and reflect light (especially light at specific frequencies), and to reveal embedded information, etc.) in response to internal or external stimuli. More than one type of material may be layered into, onto or otherwise added to the optical media device 100 as part of the optical shutter 160. The material need not be uniformly layered or uniformly distributed throughout the optical media 100.

An optical shutter 160 preferably includes all the circuitry incorporated into, onto or otherwise integral to the optical media device 100 that is necessary or desirable for: (1) activating the shutter—changing its optical properties in response to internal or external stimulus; or (2) changing the optical properties of the optical media 100 in response to internal or external stimulus.

Figure 6:
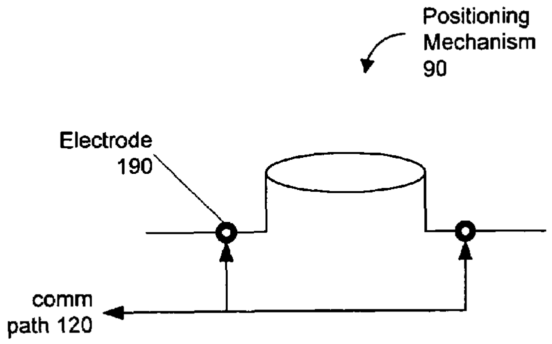
FIG. 6 is a block diagram illustrating an example positioning mechanism for securing an optical media device in the package of an activator apparatus according to an embodiment of the present invention.

FIG. 6 is a block diagram illustrating an example positioning mechanism 90 for securing an optical media device in the package of an activator apparatus according to an embodiment of the present invention. In the illustrated embodiment, the positioning mechanism 90 is a raised cylinder that is intended to engage the positioning opening of an optical media device. For example, CDs and DVDs typically have a positioning opening in the center of the disk that is configured to engage a mechanism such as positioning mechanism 90 in order to secure the optical media device in place. The positioning mechanism 90 may also take forms alternative to a raised cylinder depending on the cost of implementation and the form factor of the optical media device.

The positioning mechanism 90 may also have one or more integral electrodes 190 that are configured to engage the corresponding electrodes on the optical media device. In one embodiment, the electrode 190 may be configured as a ring to that a corresponding electrode on an optical media device will engage the electrode 190 regardless of the radial orientation of the optical media device. Preferably, the one or more electrodes 190 are electrically and/or communicatively coupled with communication path 120 so that the electrodes 190 are communicatively linked with the actuator. The one or more electrodes 190 may also be separately electrically coupled with the power source (e.g., via communication path 125 described in FIG. 4) so that the battery on the optical media device may be charged.

In one embodiment, the positioning mechanism 90 may be enhanced in ways that facilitate the contact (or proximity contact) communication between the actuator and the optical media device to be activated (e.g., made from or coated with conductive materials or including a spring mechanism to reinforce physical or near physical contact).

Figure 7:
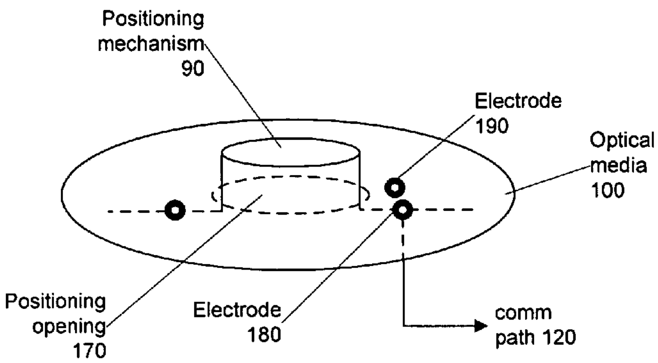
FIG. 7 is a block diagram illustrating an example optical media device engaging a positioning mechanism to establish electrical communication according to an embodiment of the present invention.

FIG. 7 is a block diagram illustrating an example optical media device 100 engaging a positioning mechanism 90 to establish electrical communication according to an embodiment of the present invention. In the illustrated embodiment, the positioning opening 170 in the optical media device 100 receives the positioning mechanism 90 in order to properly locate the electrodes 180 that are integral with the optical media device 100 with the electrodes 190 that are incorporated into the activator apparatus. Preferably, once the optical media device 100 is seated, the one or more electrodes 180 are positioned such that they are in electrical communication with the one or more electrodes 190, which in turn are communicatively coupled via communication path 120 to the actuator 70 as described above with respect to FIG. 4. Advantageously, the electrodes do not have to be in actual physical contact to be in electrical communication.

Figure 8:
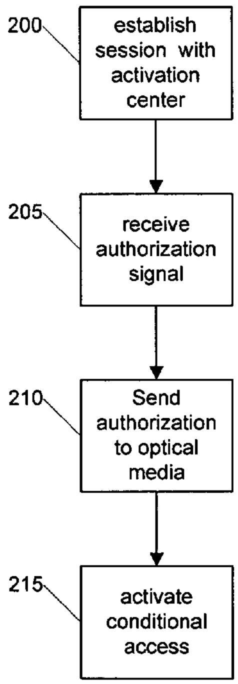
FIG. 8 is a flow diagram illustrating an example process for activating a conditional access means on an optical media device according to an embodiment of the present invention.

FIG. 8 is a flow diagram illustrating an example process for activating a conditional access means on an optical media device according to an embodiment of the present invention. Initially, in step 200, the activator establishes a session with a remote activation center. A session may be established, for example, by placing a telephone call to the activation center. The call can be placed by a consumer, can be placed by the activator apparatus in response to an instruction from a consumer, or alternatively the call can be placed by the activator apparatus pursuant to a mechanical or computer-electrical trigger.

A session may also be established over a data communications network, for example with a remote login procedure, remote procedure call, instant message, chat, email or other type of remote data connection. In one embodiment, if the communication manager of the activator is implemented as a modem a remote data session may be established over a telecommunications network with a modem at each end of the network. In the case of a data communications network, the session may also be implemented as a voice-over-internet-protocol ("VOIP") call.

When a particular activation center serves to activate only one type of optical media device, once a session has been established, the activator receives an authorization signal from the activation center, as shown in step 205. In one embodiment, the authorization signal may be an acoustic signal from the handset of a phone held by the consumer/user in proximity to the activator apparatus. Alternatively, the authorization signal can be a data packet comprising a particular code, for example, that matches a code stored in the data storage area on the optical media device and comparable by the logic integral to the optical media device.

In an alternative embodiment, the activation center may serve to activate a variety of different types of optical media devices and therefore the activation center may require an identifier or serial number for the particular optical media device to be activated. In such an embodiment, the consumer may provide the serial number via voice or keyboard input. Alternatively, the activator may read the identifier from the optical media device or query the optical media device and receive a response that includes the identifier. In such an embodiment, the identifier may be supplied to the activation center when the session is established or in response to a subsequent query from the activation center.

Once the activator has received the authorization signal from the activation center, the signal is sent to the optical media device, as illustrated in step 210. If the signal is acoustic, the signal can be played so that a transceiver on the activator apparatus receives the acoustic signal and converts it into an electrical signal that is sent to the logic on the optical media device or causes power to be sent to the optical media device. If the signal is not acoustic, the signal can be sent to the optical media device for processing by the logic or the activator may just allow power to flow to the conditional access mechanism on the optical media device. In response to the input received from the activator, the conditional access mechanism is activated in order to change the state of the optical media device, as seen in step 215. In alternative embodiments, the response may instead be to affect some other aspect of the optical media device, for example to change information that is stored in the data storage area that is integral to the optical media device.

Figure 9:
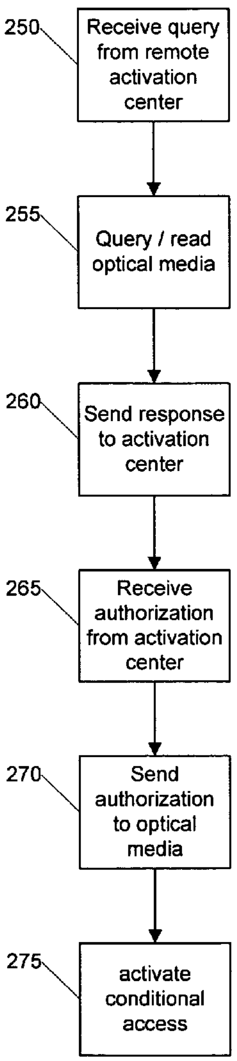
FIG. 9 a flow diagram illustrating an example process for authorizing variable access to an optical media device according to an embodiment of the present invention.

FIG. 9 a flow diagram illustrating an example process for authorizing variable access to an optical media device according to an embodiment of the present invention. Initially, the activator has already established a session with the activation center and then in step 250 the activator receives a query from the activation center. Typically, such a query may be a request for a serial number or identifier in order to uniquely determine the particular optical media device that is to be accessed. The query may also be a request for an identifier for the activator itself or for other information stored by the activator or provided by the consumer/user.

In response, the activator may read a serial number or other identifier off of the optical media device. Such a reading may be direct read instruction to the logic that results in the serial number being provided from the data store on the optical media device. Alternatively, if the logic is more sophisticated then the reading may be implemented as a query to the logic that preferably provides the same results. Optionally, the serial number may be provided by the consumer through a keypad that is connected to or integral with the activator apparatus.

Once the identifier is obtained, in step 260 a response containing the identifier is sent to the activation center. The activation center, in response, sends an authorization signal to the activator which is received by the activator in step 265. Next, in step 270 the activator sends the authorization to the optical media device after which the conditional access mechanism is activated, as illustrated in step 275. As previously described, other functions may also be carried out in place of activating (or deactivating) the conditional access mechanism.

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A system for activating an optical media, comprising:
- an optical media device, further comprising:
  - a conditional access mechanism in or on the optical media, the conditional access mechanism constructed to receive an electrical signal; and
  - an optical shutter in or on the optical media arranged to receive the electrical signal and constructed to alter at least one optical, physical or visual property responsive to the electrical signal; and
- an apparatus for activating the optical media device, further comprising:
  - a positioning mechanism configured to engage the optical media device;
  - an electrode configured to establish electrical communication with the optical media device when the optical media device is engaged with the positioning mechanism; and
  - a power source communicatively coupled with the electrode via an electrical communication path, wherein the power source is configured to provide the electrical signal to the optical media device when the optical media device is engaged with the positioning mechanism to activate the conditional access mechanism.

2. The apparatus of claim 1, further comprising an actuator configured to send an electrical signal to the optical media device to activate a conditional access mechanism resident on the optical media device.

3. The apparatus of claim 2, wherein the electrical signal comprises power and a data communication.

4. The apparatus of claim 3, wherein the actuator is configured to receive a data communication from the optical media device.

5. The apparatus of claim 2, wherein the actuator is further configured to communicate with an external authorization authority, wherein the actuator receives an authorization instruction from the external authorization authority to send the electrical signal to the optical media device to activate the conditional access mechanism.

6. The apparatus of claim 5, wherein the actuator is configured to communicate with the external authorization authority via a telecommunications network.

7. The apparatus of claim 5, wherein the actuator is configured to communicate with the external authorization authority via a data communications network.

8. The apparatus of claim 1, further comprising an actuator configured to control the electrical signal provided by the power source to the optical media device.

9. The apparatus of claim 8, wherein the actuator is configured to receive a data communication from the optical media device.

10. The apparatus of claim 8, wherein the actuator is further configured to communicate with an external authorization authority, wherein the actuator receives an authorization instruction from the external authorization authority related to the control of the electrical signal provided by the power source to the optical media device.

11. The apparatus of claim 10, wherein the actuator is configured to communicate with the external authorization authority via a telecommunications network.

12. The apparatus of claim 10, wherein the actuator is configured to communicate with the external authorization authority via a data communications network.

13. The apparatus of claim 1, wherein the electrical communication path is established by physical contact between the power source and the electrode.

14. The apparatus of claim 1, wherein the electrical communication path is established by near-physical contact between the power source and the electrode.

15. The apparatus of claim 1, wherein the apparatus is constructed as a stand-alone device.

16. The apparatus of claim 15, wherein the apparatus is constructed as a disc package.

17. An apparatus for activating an optical media device having a conditional access mechanism, comprising:

a radio frequency transceiver configured to establish communication with the optical media device when the optical media device is in proximity to the apparatus;

a power source communicatively coupled with the transceiver via an electrical communication path, wherein the power source is configured to provide an electrical signal to the optical media device via the radio frequency transceiver;

wherein the conditional access mechanism is an optical shutter assembly arranged to activate and deactivate the optical media device.

18. An apparatus for activating an optical media device having a conditional access mechanism, comprising:

a radio frequency transceiver configured to establish communication with the optical media device when the optical media device is in proximity to the apparatus;

a power source communicatively coupled with the transceiver via an electrical communication path, wherein the power source is configured to provide an electrical signal to the optical media device via the radio frequency transceiver;

a receiver circuit cooperating with the radio frequency transceiver configured to receive an identification value from the optical media device;

a network connection configured to send the identification value to a network server and receive a data packet from the network server; and a transmission circuit cooperating with the radio frequency transceiver configured to send the data packet to the optical media device.

19. A target device comprising:

a content stored in an optical media;

a transceiver configured to communicate with external devices; and an access control logic integral to the optical media, and coupled to the transceiver, the access control logic configured to control an optical shutter assembly that restricts access to content stored in the optical media.

20. The target device of claim 19 further comprising:

a data storage unit integral to the optical media and including a first key.

21. The target device of claim 20 wherein the access control logic is communicatively coupled to the data storage unit, the access control logic configured to receive an activation code, compare the activation code with the first key, and permit access to the content storage media if the activation code matches the first key.

22. The target device of claim 21 wherein the target device includes a target identifier that is sent to an activation center to receive the activation code, the activation code being associated with the target identifier.

23. The target device of claim 19 further comprising a package constructed to hold the optical media.

24. The target device of claim 23, wherein the transceiver is in the package.

25. The target device of claim 23, wherein the transceiver is integral to the optical media.

26. The target device of claim 23 further comprising:

a battery in the package; and electrodes in the package positioned to connect the battery to the optical media.

27. An optical disc comprising:

a content area;

a conditional access mechanism arranged to selectively disable access to the content area, the conditional access mechanism comprising an optical shutter in or on the optical disc arranged to receive an electrical signal and constructed to alter at least one optical, physical or visual property responsive to the electrical signal;

a receiver circuit configured to receive an authorization data packet;

a code stored in a data storage area; and logic connected to the conditional access mechanism and configured to compare the stored code to the authorization data packet and, responsive to the comparison, to generate the electrical signal.

28. The optical disc of claim 27 further comprising:

a disc identifier value; and a transmission circuit configured to transmit the disc identifier responsive to an external query.

29. The optical disc of claim 28, wherein the transmission circuit is an RF transmission circuit.

30. The optical disc of claim 27, wherein the receiver circuit is an RF receiver circuit.

31. The optical disc of claim 27, wherein the conditional access mechanism is integrally formed on the optical disc.

32. The optical disc of claim 27, wherein the code is integrally stored in the optical disc.

33. The optical disc of claim 27, wherein the logic is integral to the optical disc.

* * * * *